(12) United States Patent
Furukawa et al.

(10) Patent No.: US 8,947,676 B2
(45) Date of Patent: Feb. 3, 2015

(54) ASPHERIC SURFACE MEASURING METHOD, ASPHERIC SURFACE MEASURING APPARATUS, OPTICAL ELEMENT PRODUCING APPARATUS AND OPTICAL ELEMENT

(71) Applicant: Canon Kabushiki Kaisha, Tokyo (JP)

(72) Inventors: Yasunori Furukawa, Utsunomiya (JP); Yumiko Osaki, Utsunomiya (JP); Yoshiki Maeda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 145 days.

(21) Appl. No.: 13/789,872

(22) Filed: Mar. 8, 2013

(65) Prior Publication Data
US 2013/0235477 A1    Sep. 12, 2013

(30) Foreign Application Priority Data
Mar. 9, 2012 (JP) .................................. 2012-052500

(51) Int. Cl.
*G01B 11/24* (2006.01)
*G02B 3/04* (2006.01)
*G01M 11/00* (2006.01)

(52) U.S. Cl.
CPC ........ *G01B 11/24* (2013.01); *G02B 3/04* (2013.01); *G01M 11/005* (2013.01)
USPC .......................................... 356/601; 356/512

(58) Field of Classification Search
USPC .......... 356/601, 612, 512–516; 359/708, 718, 359/642
See application file for complete search history.

(56) References Cited

U.S. PATENT DOCUMENTS

2013/0235472 A1    9/2013  Furukawa
2013/0235478 A1    9/2013  Maeda

FOREIGN PATENT DOCUMENTS

| JP | 09-329427 A | 12/1997 |
| JP | 10-281736 A | 10/1998 |
| JP | 2000-097663 A | 4/2000 |
| JP | 2004-125768 A | 4/2004 |
| JP | 2006-133059 A | 5/2006 |

(Continued)

OTHER PUBLICATIONS

Pfund, et al.; "Nonnull testing of rotationally symmetric aspheres: a systematic error assessment"; 2001 Optical Society of America, Feb. 1, 2001/vol. 40, No. 4/Applied Optics.

*Primary Examiner* — Tri T Ton
(74) *Attorney, Agent, or Firm* — Rossi, Kimms & McDowell LLP

(57) ABSTRACT

The method includes: measuring a first wavefront of a reference light on a sensor by using the sensor; calculating a second wavefront of the reference light on the sensor by using a parameter of an optical system; changing an optical system parameter in calculation such that a difference between rotationally symmetric components of the first and second wavefronts becomes smaller; calculating, by using the changed parameter, a magnification distribution of rays of the reference light between on the sensor and on a sensor conjugate surface; measuring a first ray angle distribution of the reference light by using the sensor, and measuring a second ray angle distribution of a measurement light by using the light-receiving sensor. The method calculates the profile of the measurement object aspheric surface by using the profile of the reference aspheric surface, the first and second ray angle distributions and the magnification distribution.

18 Claims, 5 Drawing Sheets

(56) References Cited

FOREIGN PATENT DOCUMENTS

| | | |
|---|---|---|
| JP | 2009-180554 A | 8/2009 |
| WO | 03/006920 A1 | 1/2003 |

ASPHERIC SURFACE MEASURING METHOD, ASPHERIC SURFACE MEASURING APPARATUS, OPTICAL ELEMENT PRODUCING APPARATUS AND OPTICAL ELEMENT

BACKGROUND OF THE INVENTION

1. Field of the Invention

The present invention relates to a technology for measuring aspheric surface profile of an optical element such as an aspheric lens.

2. Description of the Related Art

As a non-contact measuring method for fast measuring aspheric surface profile of an aspheric lens, a method has been proposed in Jahannes Pfund, Norbert Lindlein and Johannes Schwider, "NonNull testing of rotationally symmetric aspheres: a systematic error assessment" (App. Opt. 40 (2001) p. 439), which projects light having a spherical wavefront onto an aspheric surface as a measurement object surface through an optical system and measures a measurement light reflected by the measurement object surface by using a Shack-Hartmann sensor provided as a light-receiving sensor. This measuring method has an advantage of being able to measure profiles of various designed measurement object surfaces, as compared with an interferometer using a null lens disclosed in Japanese Patent Laid-Open No. 9-329427. Moreover, this measuring method also has an advantage that, as compared with a stitching interferometer disclosed in Japanese Patent Laid-Open No. 2004-125768 which moves a sample during measurement and a scanning interferometer disclosed in Japanese Patent No. 3971747, there is no need to use a stage and a length measuring device for moving the sample with high accuracy, and a complex analysis program.

In the method using the Shack-Hartmann sensor, proposed in Jahannes Pfund, Norbert Lindlein and Johannes Schwider, "NonNull testing of rotationally symmetric aspheres: a systematic error assessment" (App. Opt. 40 (2001) p. 439), the aspheric measurement object surface does not reflect the measurement light perpendicularly thereto and therefore a ray angle of the reflected measurement light from the measurement object surface is different from a ray angle of the measurement light reaching the measurement object surface. Consequently, the reflected measurement light entering the light-receiving sensor is not collimated, which is detected as a wavefront significantly different from a planer wavefront. Thus, the wavefront of the measurement light reflected by the measurement object surface, measured by the light-receiving sensor, does not directly show the profile of the measurement object surface, unlike a Fizeau interferometer.

Calculation of the profile of the measurement object surface from the measured wavefront requires a positional magnification (so-called distortion, and also called a coordinate magnification) that is a ratio of lateral coordinates of the sensor surface 8a and lateral coordinates of the measurement object surface, and an angular magnification that is a ratio of ray angles on the sensor surface and on the measurement object surface.

However, these positional magnification and angular magnification are not constant with respect to distance from an optical axis, that is, have distribution. The distribution changes sensitively, especially to error of curvature radius of a lens included in the optical system, error of position in an optical axis direction (so-called alignment error), spherical aberration and others. Therefore, calibration for the distribution is needed. Japanese Patent Laid-Open Nos. 2000-97663, 10-281736, 2006-133059 and 2009-180554 disclose calibration methods for the positional magnification distribution.

The calibration method disclosed in Japanese Patent Laid-Open Nos. 2000-97663, 10-281736 and 2006-133059 performs calibration of the positional magnification distribution by moving a measurement object surface by a known distance and detecting a change amount of a measured value by a light-receiving sensor with respect to the movement of the measurement object surface. Thus, the method not only requires a stage for moving the measurement object surface with high accuracy and a length measurement device for measuring the movement distance with high accuracy, but also has difficulty in accurate calibration of both the positional and angular magnification distributions.

Moreover, the calibration method disclosed in Japanese Patent Laid-Open No. 2009-180554 performs calibration of the positional magnification distribution by moving part of an optical system of an interferometer. However, the method performs the calibration by using radii of interference fringes on a light-receiving portion as an indicator, which has a problem that cannot accurately measure the radii of the interference fringes because their pitch is too small. Furthermore, the method has difficulty in accurate calibration of the angular magnification distribution.

SUMMARY OF THE INVENTION

The present invention provides an aspheric surface measuring method, an aspheric surface measuring apparatus and an optical element producing apparatus capable of easily performing calibration of a positional magnification distribution and an angular magnification distribution even if the magnification distributions are different from calculated (designed) ones due to error of its optical system.

The present invention provides as one aspect thereof an aspheric surface measuring method for measuring profile of a measurement object aspheric surface by using output from a light-receiving sensor to which a measurement light projected onto and reflected by the measurement object aspheric surface is introduced through an optical system. The method includes a step of providing a reference aspheric surface whose profile has been measured, a step of measuring a first wavefront of a reference light, which is projected onto and reflected by the reference aspheric surface and is introduced to the light-receiving sensor through the optical system, on the light-receiving sensor by using the output from the light-receiving sensor, a step of calculating a second wavefront of the reference light on the light-receiving sensor by using a parameter of the optical system, a parameter change step of changing the parameter of the optical system in calculation such that a difference between rotationally symmetric components of the first and second wavefronts becomes smaller than before the change of the parameter, a step of calculating, by using the changed parameter, at least one magnification distribution of a positional magnification distribution showing a positional relationship of rays of the reference light between positions on the light-receiving sensor and on a sensor conjugate surface having a conjugate relationship with the light-receiving sensor provided by the optical system and an angular magnification distribution showing an angular relationship of the rays of the reference light between angles on the light-receiving sensor and on the sensor conjugate surface, a step of measuring a first ray angle distribution that is an angle distribution of the rays of the reference light by using the output from the light-receiving sensor, a step of measuring a second ray angle distribution that is an angle distribution of rays of the measurement light by using the output from the light-receiving sensor, and a step of calculating the profile of the measurement object aspheric surface by using the profile of the reference aspheric surface, the first ray angle distribution, the second ray angle distribution and the at least one magnification distribution.

The present invention provides as another aspect thereof an aspheric surface measuring method for measuring profile of a measurement object aspheric surface by using output from a light-receiving sensor to which a measurement light projected onto and reflected by the measurement object aspheric surface is introduced through an optical system. The method includes a step of providing a reference aspheric surface whose profile has been measured, a step of measuring a first wavefront of a reference light, which is projected onto and reflected by the reference aspheric surface and is introduced to the light-receiving sensor through the optical system, on the light-receiving sensor by using the output from the light-receiving sensor, a step of calculating a second wavefront of the reference light on the light-receiving sensor by using a parameter of the optical system, a parameter change step of changing a parameter of the optical system in calculation such that a difference between rotationally symmetric components of the first and second wavefronts becomes smaller than before the change of the parameter, a step of measuring a first ray angle distribution that is an angle distribution of rays of the reference light by using the output from the light-receiving sensor, a step of measuring a second ray angle distribution that is an angle distribution of rays of the measurement light by using the output from the light-receiving sensor, a step of performing ray tracing calculation of the rays of the reference light by using the changed parameter, the first ray angle distribution and the second ray angle distribution to calculate intersection points of the rays of the reference light with the reference aspheric surface and ray angles thereof at the intersection points, and a step of calculating the profile of the measurement object aspheric surface by using the profile of the reference aspheric surface, the intersection points and the ray angles thereat.

The present invention provides as still another aspect thereof an aspheric surface measuring apparatus configured to measure profile of a measurement object aspheric surface. The apparatus includes an optical system, a light-receiving sensor to which a measurement light projected onto and reflected by the measurement object aspheric surface is introduced through the optical system, a wavefront measuring device configured to measure a first wavefront of a reference light, which is projected onto and reflected by a reference aspheric surface whose profile has been measured and is introduced to the light-receiving sensor through the optical system, on the light-receiving sensor by using the output from the light-receiving sensor, a wavefront calculating device configured to calculate a second wavefront of the reference light on the light-receiving sensor by using a parameter of the optical system, a parameter changing device configured to change the parameter of the optical system in calculation such that a difference between rotationally symmetric components of the first and second wavefronts becomes smaller than before the change of the parameter, and a profile calculating device configured to calculate the profile of the measurement object aspheric surface. The profile calculating device is configured to calculate, by using the parameter changed by the parameter changing device, at least one magnification distribution of a positional magnification distribution showing a positional relationship of rays of the reference light between positions on the light-receiving sensor and on a sensor conjugate surface having a conjugate relationship with the light-receiving sensor provided by the optical system and an angular magnification distribution showing an angular relationship of the rays of the reference light between angles on the light-receiving sensor and on the sensor conjugate surface, to measure, by using the output from the light-receiving sensor, a first ray angle distribution that is an angle distribution of the rays of the reference light and a second ray angle distribution that is an angle distribution of rays of the measurement light, and to calculate the profile of the measurement object aspheric surface by using the profile of the reference aspheric surface, the first ray angle distribution, the second ray angle distribution and the at least one magnification distribution.

The present invention provides as yet another aspect thereof an aspheric surface measuring apparatus configured to measure profile of a measurement object aspheric surface. The apparatus includes an optical system, a light-receiving sensor to which a measurement light projected onto and reflected by the measurement object aspheric surface is introduced through the optical system, a wavefront measuring device configured to measure a first wavefront of a reference light, which is projected onto and reflected by a reference aspheric surface whose profile has been measured and is introduced to the light-receiving sensor through the optical system, on the light-receiving sensor by using the output from the light-receiving sensor, a wavefront calculating device configured to calculate a second wavefront of the reference light on the light-receiving sensor by using a parameter of the optical system, a parameter changing device configured to change the parameter of the optical system in calculation such that a difference between rotationally symmetric components of the first and second wavefronts becomes smaller than before the change of the parameter, and a profile calculating device configured to calculate the profile of the measurement object aspheric surface. The profile calculating device is configured to measure, by using the output from the light-receiving sensor, a first ray angle distribution that is an angle distribution of rays of the reference light reflected by the reference aspheric surface and a second ray angle distribution that is an angle distribution of rays of the measurement light, perform ray tracing calculation of the rays of the reference light by using the changed parameter, the first ray angle distribution and the second ray angle distribution to calculate intersection points of the rays of the reference light with the reference aspheric surface and ray angles thereof at the intersection points, and calculate the profile of the measurement object aspheric surface by using the profile of the reference aspheric surface, the intersection points and the ray angles thereat.

The present invention provides as further another aspect thereof an optical element producing apparatus includes a shaping apparatus configured to shape an optical element, and the above-described measuring apparatus.

The present invention provides as yet further another aspect thereof an optical element produced by using the above optical element producing apparatus.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
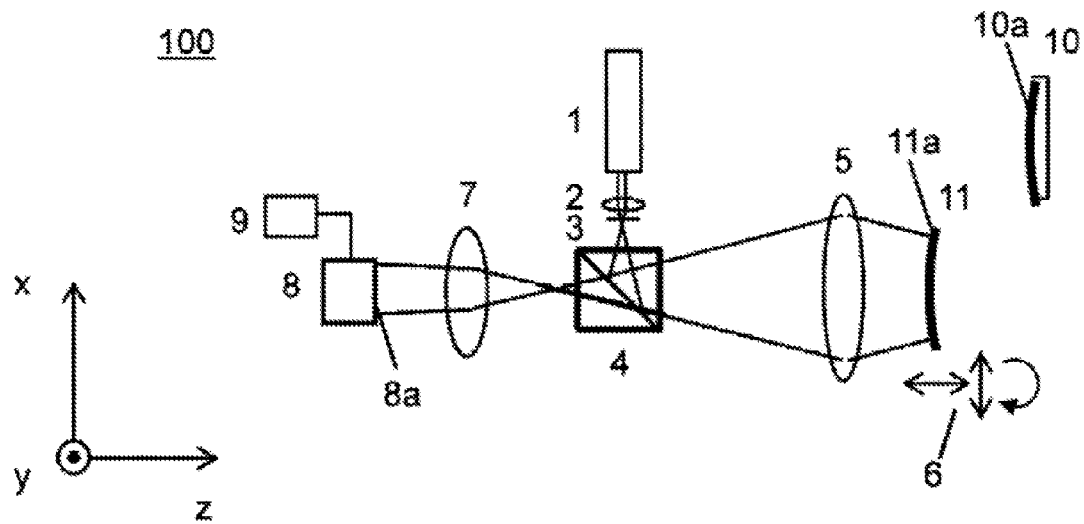
FIG. 1 schematically shows a configuration of an aspheric surface measuring apparatus using an aspheric surface measuring method that is Embodiment 1 of the present invention.

FIG. 1 shows a configuration of an aspheric surface measuring apparatus 100 configured to perform measurement by an aspheric surface measuring method that is a first embodiment (Embodiment 1) of the present invention. Description position and movement of each of constituent elements will hereinafter be made on a basis of an x-y-z orthogonal coordinate system shown in FIG. 1.

In FIG. 1, reference numeral 1 denotes a light source, 2 a condenser lens, 3 a pinhole, 4 a half mirror and 5 a projecting lens. Reference numeral 10 denotes a reference lens whose one side surface is a reference aspheric surface (hereinafter simply referred to as "a reference surface") 10a serving as a measurement reference of profile (shape) of a measurement object aspheric surface described later. Reference numeral 11 denotes a measurement object lens as an object optical element whose one side surface is the measurement object aspheric surface (hereinafter simply referred to as "a measurement object surface") 11a as an aspheric surface to be measured. In FIG. 1, the reference surface 10a and the measurement object surface 11a are convex surfaces.

Reference numeral 6 denotes a lens moving mechanism that moves the reference lens 10 and the measurement object lens 11 so as to adjust position of each thereof in a z-direction (optical axis direction), position of each thereof in an x-direction and a y-direction (that is, in an x-y plane orthogonal to the optical axis direction) and tilt (posture) of each thereof.

Reference numeral 7 denotes an imaging lens, and 8 a light-receiving sensor (hereinafter simply referred to as "a sensor") having a light-receiving surface (detection surface) 8a. Reference numeral 9 denotes an analysis calculating device constituted by a computer and serving as a wavefront measuring device, a wavefront calculating device, a parameter changing device and a profile calculating device.

Light (a reference light or a measurement light) from the light source 1 is condensed by the condenser lens 2 toward the pinhole 3. A spherical wave from the pinhole 3 is reflected by the half mirror 4, and then converted into convergent light by the projecting lens 5. The convergent light is reflected by the reference surface 10a or the measurement object surface 11a, and passes through the projecting lens 5, the half mirror 4 and the imaging lens 7 to enter the light-receiving surface 8a of the sensor 8. The projecting lens 5, the half mirror 4 and the imaging lens 7 constitute an optical system that projects the light from the light source 1 to the reference surface 10a or the measurement object surface 11a and introduces the light reflected by the reference surface 10a or the measurement object surface 11a to the sensor 8. In the optical system, the half mirror 4 and the projecting lens 5 constitute a first optical system that projects the light from the light source 1 to the reference surface 10a or the measurement object surface 11a, and the imaging lens 7 constitutes a second optical system that introduces the light reflected by the reference surface 10a or the measurement object surface 11a to the sensor 8.

The light source 1 is constituted by a laser source or a laser diode and emits a monochrome laser light. The pinhole 3 is provided to produce a spherical wave having small aberration. Instead of the pinhole 3, a single mode fiber may be used.

The projecting lens 5 and the imaging lens 7 are respectively constituted by a plurality of lens elements. Focal length, curvature radius and diameter of each of the projecting lens 5 and the imaging lens 7 and magnification of combination of the projecting lens and the imaging lens 7 are decided on a basis of diameter (effective diameter) and curvature radius of the measurement object surface 11a and size (area) of the light-receiving surface 8a of the sensor 8.

Use of only one optical system limits a measurable aspheric profile range. Thus, this embodiment allows change (interchange) of at least one of the projecting lens 5 and imaging lens 7, which are optical elements included in the optical system, among ones whose focal lengths are mutually different depending on parameters (designed value) of the measurement object surface 11a such as effective diameter, curvature radius and aspheric amount.

As mentioned above, the light (measurement light) as the convergent spherical wave is projected onto the measurement object surface 11a. Reflection angle of the light depends on the aspheric amount (in other words, deviation amount from a spherical surface) and profile error; the reflection angle differs more widely from incident angle thereof to the measurement object surface 11a as the aspheric amount increases, and thereby angles of rays of the light measured at the sensor 8 also increase.

The reference lens 10 is a lens produced by using same parameters (designed values) as those of the measurement object lens 11; profile of the reference surface 10a has a difference of a few μm or less from that of the measurement object surface 11a. The profile of the reference surface 10a is accurately measured by another apparatus than the measuring apparatus 100 of this embodiment, such as a probe (sensing pin) type measuring apparatus, and data of the measured surface profile (hereinafter simply referred to as "measured profile") is stored in the analysis calculating device 9.

The sensor 8 is constituted by a microlens array including a lot of micro focusing lenses arranged in a matrix manner and an image sensor such as a CCD, which is generally called a Shack-Hartmann sensor. In the sensor 8, rays (light flux) passing through the microlens array are focused by each micro focusing lens on the image sensor. The image sensor photoelectrically converts optical images formed by the rays from the respective micro focusing lenses to output electric signals. An incident angle $\Psi$ of the ray entering the image sensor is calculated from a detection result of a difference $\Delta p$ between position of a spot formed by the rays focused by the micro focusing lens and a pre-calibrated position such as a spot position when collimated rays enter the image sensor. The incident angle $\Psi$ and the spot position difference $\Delta p$ have the following relationship where f represents distance between the microlens array and the image sensor:

$\Psi = a\tan(\Delta p/f)$.

Performing the above calculation on all the micro focusing lenses enables measurement of an angle distribution of the rays entering the sensor 8 (that is, the image sensor), by using the output from the sensor 8.

The sensor 8 is only necessary to measure a wavefront or an angle distribution of rays, so that other sensors than the Shack-Hartmann sensor may be used such as a Shearing interferometer and a Talbot interferometer each constituted by a diffraction grating and an image sensor. A Hartmann method may also be used which uses a Hartmann plate and a CCD sensor. The Talbot interferometer is described in M. Takeda, S. Kobayashi, "Lateral Aberration Measurements with a digital Talbot Interferometer," App. Opt. 23, pp 1760-1764, 1984.

When size (diameter) of the rays received by the sensor 8 is larger than the area of the light-receiving surface 8a of the sensor 8, a method may be employed which moves the sensor 8 in the plane (x-y plane) parallel to the light-receiving surface 8a, measures the ray angle distribution at each of sensor movement positions, and then pieces together data of the ray angle distribution measured at the respective sensor movement positions.

In order to shape the measurement object surface 11a into a target profile, lateral coordinates at which correction shaping process on the measurement object surface 11a should be performed and a correction amount by the correction shaping process are calculated on a basis of difference of the data of the measured profile obtained by the measuring apparatus 100 from data of the target profile, and the correction shaping process is performed by a shaping part (shaping apparatus) of an optical element producing apparatus described later in Embodiment 4.

However, since a position distribution (lateral coordinates) of the measured ray angle distribution is a position distribution on the sensor 8, the correction shaping requires conversion of the position distribution of the measured ray angle distribution into coordinates on the measurement object surface 11a. In addition, since a difference of ray angles for the reference surface 10a and the measurement object surface 11a measured by the sensor 8 is different from a difference of ray reflection angles at the reference surface 10a and the measurement object surface 11a, conversion of the angle difference also should be performed.

Thus, this embodiment converts a ray position distribution and the ray angle distribution that are measured by the sensor 8 into a ray position distribution and a ray angle distribution on a sensor conjugate surface by using a data table of a positional magnification distribution and an angular magnification distribution described below. The sensor conjugate surface is a surface having a conjugate relationship with the sensor 8 provided by the optical system. Then, this embodiment performs ray tracing calculation from the sensor conjugate surface, and thereby calculates a ray position distribution and a ray angle distribution on the measurement object surface 11a.

Next, description will be made of a sequence of a measurement process (aspheric measuring method) using the measuring apparatus 100 configured as above with reference to a flowchart shown in FIG. 2. This measurement process is executed by the analysis calculating device 9 constituted by a computer according to a computer program (analysis software). In the following description, absolute coordinates (absolute position) in a plane orthogonal to an optical axis of the reference surface 10a (reference lens 10) placed in the measuring apparatus 100 are expressed by (x, y).

The measurement process includes the following four steps: a preprocessing step A; a magnification distribution calculation step B; a profile measurement step C; and an analysis step D.

Figure 3:
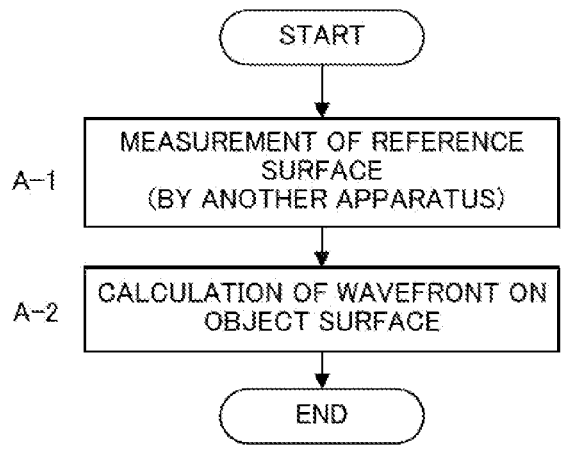
FIG. 3 is a flowchart showing a preprocessing step in Embodiment 1.

First of all, description will be made of the preprocessing step A with reference to a flowchart shown in FIG. 3.

At step A-1, the process measures profile (surface profile) of the reference surface 10a by using another measuring apparatus capable of measuring the profile of the reference surface 10a with high accuracy, such as the probe type measuring apparatus. Thus, the process provides the reference surface 10a whose profile has been measured.

At step A-2, the process calculates a wavefront $W_{cal}$ as a second wavefront on the light-receiving surface (hereinafter referred to also as "a sensor surface") 8a of the sensor 8 by using data of the measured profile (measured value) of the reference surface 10a obtained by the measurement at step A-1 and a parameter of the optical system of this apparatus 100. The wavefront $W_{cal}$ is hereinafter referred to also as "a calculated wavefront $W_{cal}$".

The parameter of the optical system (hereinafter referred to as "an optical system parameter") include curvature radii of optical elements constituting the optical system, such as lenses and mirrors, refractive indices thereof and distances therebetween, which can be also called designed values (designed value data) of the optical system. Moreover, the optical system parameter may include information on wavefront aberration and the like. When aberration and assembling error of the optical system and surface profiles of the lenses and mirrors are known or measurable, the process calculates the wavefront $W_{cal}$ by reflecting these values to the designed value of the optical system. The process may calculate the wavefront $W_{cal}$ by measuring temperature of a lens barrel that holds the optical system or the sensor 8, by calculating from the measured temperature an extended amount of the lens barrel, distances among the optical elements and a distance between the sensor 8 and the optical system, and by reflecting the calculated values to the designed value of the optical system. It is desirable that the wavefront $W_{cal}$ be expressed by a Zernike function that is an orthogonal function.

Next, description of the magnification distribution calculation step B will be made with reference to a flowchart shown in FIG. 4. The "magnification distribution" in this step includes a positional magnification distribution (or a coordinate magnification distribution) α and an angular magnification distribution β. The positional magnification distribution α shows a positional relationship of rays of light (reference light) reflected by the reference surface 10a shown in FIG. 1 between positions on the sensor surface and on the sensor conjugate surface. The angular magnification distribution β shows an angular relationship of the rays of the light reflected by the reference surface 10a between angles on the sensor surface and on the sensor conjugate surface. Specifically, as shown in FIG. 5A, when R' represents distance to an incident position of a ray on the sensor surface from the optical axis and r' represents distance to an incident position of the ray on the sensor conjugate surface from the optical axis, the positional magnification distribution α is expressed as follows:

$r'/R'$.

Moreover, when tilting of the reference surface 6a by a minute angle changes a ray reflection angle in a meridional plane on the sensor conjugate surface by Δv and changes a ray reflection angle in a meridional plane on the sensor surface by ΔV, the angular magnification distribution β is expressed as follows:

$\Delta V/\Delta v$.

The process calculates the positional magnification distribution α and the angular magnification distribution β by a ray tracing software by using the optical system parameter (designed value), surface profiles of the optical system and a measured value of a transmitted wavefront. The magnification distribution calculation step in this embodiment is performed at an initial alignment after assembly of the measuring apparatus 100, when a gap from the designed value increases due to error of the optical system caused by environmental variation in air pressure, temperature, humidity and others, or when a measurement object is changed to another one whose measurement object surface has a different profile. Alignment of the optical system is performed by arbitrarily disposing a reflective surface in the optical system and measuring wavefronts by the sensor 8 and measuring distances by a length measuring device, so that the optical system involves an error of 10 μm or less. Moreover, the optical system involves, due to the environmental variation, an error of 10 μm or less.

Furthermore, in this embodiment, the process determines amount of the error of the optical system by measuring a wavefront of light reflected by the reference surface 10a as described later.

In this embodiment, the process uses both the positional magnification distribution α and the angular magnification distribution β. However, the process may use at least one of the positional magnification distribution α and the angular magnification distribution β; for example, the process uses only the angular magnification distribution β when the positional magnification distribution α can be regarded as being uniform, and the process uses only the positional magnification distribution α when the angular magnification distribution β can be regarded as being uniform.

At step B-1, the process allows placement of the reference lens 10 in the moving mechanism 6.

Figure 5A:
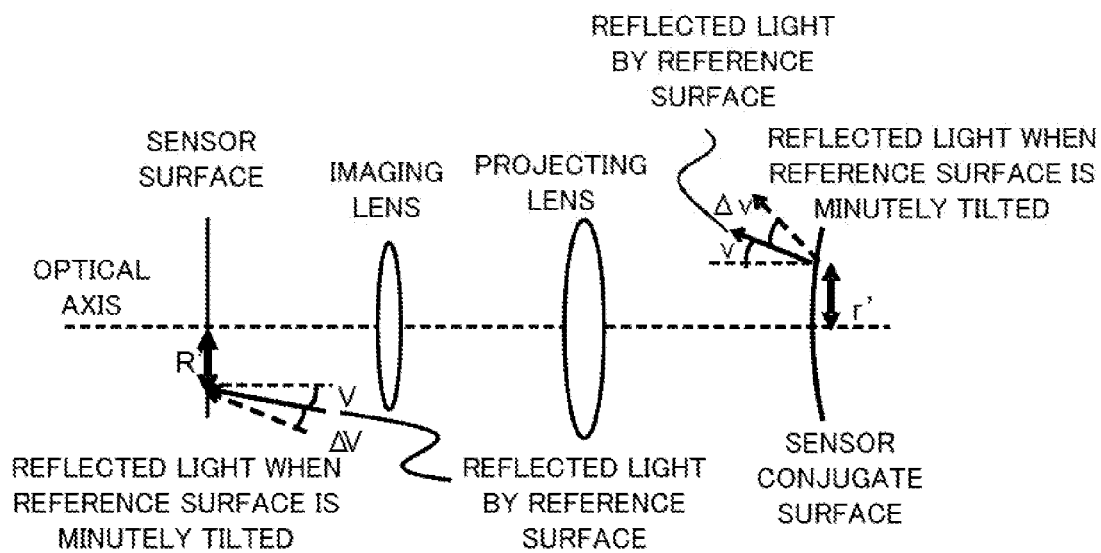
FIGS. 5A and 5B show ray positions and ray angles.
Figure 5B:
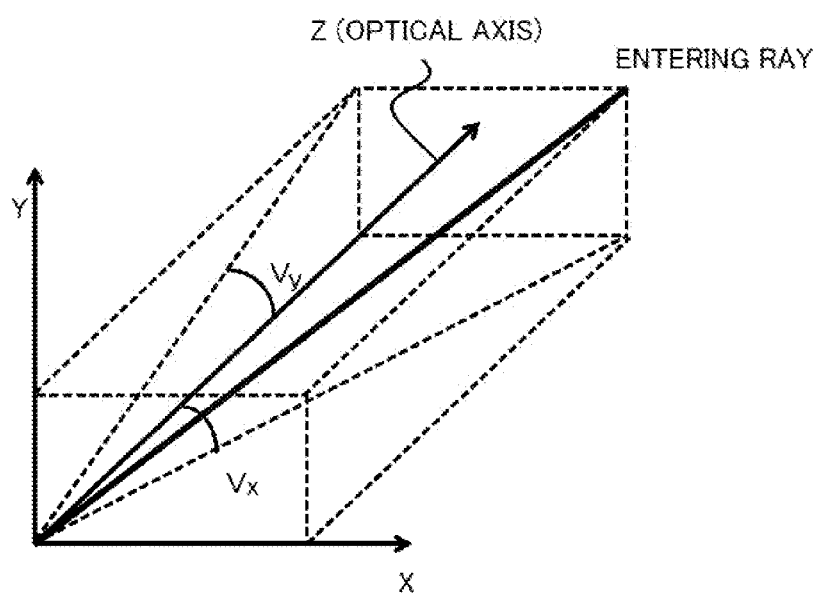

At step B-2, the process measures, by using the output from the sensor 8, a wavefront (first wavefront) $W_m$ of light reflected by the reference surface 10a. This wavefront $W_m$ measured at this step is hereinafter referred to as "a measured wavefront $W_m$". The sensor 8 detects a ray angle distribution (Vx, Vy) at each of a plurality of coordinates (X, Y) on the light-receiving surface (sensor surface) 8a. In this description, V represents a ray angle detected on the sensor surface as shown in FIG. 5A, and Vx and Vy respectively represent an x-direction component and a y-direction component of the ray angle V measured on the sensor surface as shown in FIG. 5B. The coordinates (X, Y) on the sensor surface correspond to a center position of the microlens. The distance R' from the optical axis on the sensor surface is expressed by the following expression:

$$R' = \sqrt{(X^2 + Y^2)}.$$

At step B-3, the process calculates a difference ΔW between the measured wavefront $W_m$ and the calculated wavefront $W_{cal}$ obtained at step A-2, and determines whether or not the difference ΔW is smaller than a predetermined value (threshold) TH. The process proceeds to step B-5 if the difference ΔW is smaller than the predetermined value TH, and proceeds to step B-4 if the difference ΔW is equal to or larger than the predetermined value TH. The predetermined value TH is, though depending on the amount of the error of the optical system, about 50 nm for components of the wavefront other than a spherical component, such as a tilt component and a coma component, and about 1 μm for the spherical component. The predetermined value TH may be reset after step B-5 described later is performed.

At step B-4, the process adjusts position of the reference lens 10 (reference surface 10a) in the x-y plane and tilt of the reference lens 10 with respect to the x-y plane, through the moving mechanism 6. When the optical system including the half mirror 4, the projecting lens 5 and the imaging lens 7 involves the error, the difference of the spherical components of the wavefronts does not become sufficiently small just by the positional adjustment of the reference surface 10a in the optical axis direction. The process performs the adjustment of the position of the reference lens 10 through the moving mechanism 6 such that differences between the tilt components and between the coma components of the measured wavefront $W_m$ and the calculated wavefront $W_{cal}$ become sufficiently small. Moreover, the process adjusts the position of the reference surface 10a in the optical axis direction (z-direction) such that a difference between spherical components of the measured wavefront $W_m$ and the calculated wavefront $W_{cal}$, that is, a difference between spherical terms ($Z_4, Z_9, Z_{16}, Z_{25}, \ldots$) of the Zernike function becomes small. The spherical terms Z of the Zernike function are expressed by the following expression (1) where h represents distance on the sensor surface from the optical axis normalized by an analysis radius.

$$Z_{(i+1)^2} = \sum_{j=0}^{i} (-1)^j \frac{(2i-j)!}{j!(i-j)!^2} h^{2(i-j)} \qquad (1)$$

At step B-5 (parameter change step), the process changes, in calculation, the optical system parameter such that the difference (hereinafter represented by ΔW) between the spherical components of the measured wavefront $W_m$ and the calculated wavefront $W_{cal}$ becomes smaller than that before the change of the optics system parameter (desirably, the difference ΔW becomes minimum). Coincidence of the measured wavefront $W_m$ with the calculated wavefront $W_{cal}$ results in coincidence of the positional magnification distribution α and the angular magnification distribution β of the measuring apparatus 100 with the calculated positional magnification distribution and the calculated angular magnification distribution.

The change of the optical system parameter is performed as below.

First of all, the difference ΔW between the spherical components, which are rotationally symmetric components, of the measurement wavefront $W_m$ and the calculated wavefront $W_{cal}$ is expressed by the following expression (2):

$$\Delta W = W_m - W_{cal} = \sum_{i=1}^{n} s_i Z_{(i+1)^2} \qquad (2)$$

where n represents an integer of 2 or more; a greater value of n shows a higher-order spherical component, and $s_i$ represents a coefficient of the spherical term $Z_{(i+1)}^2$.

The process selects one or more optical system parameters each of whose change changes the spherical component of the calculated wavefront $W_{cal}$. The one or more optical system parameters each of whose change changes the spherical component of the calculated wavefront $W_{cal}$ include at least one of distance between optical surfaces of one or more optical elements included in the optical system, curvature radius of each optical surface, profile of each optical surface, aberration generated by each optical element, refractive index of a material of each optical element, homogeneity (internal distortion) of each optical element, and positions of the reference surface 10a and the sensor surface 8a in the optical axis direction. The value of N is desirable to be 2 or more, as described later. The calculation of the homogeneity of the optical element uses an even-order distribution including, as a variable, distance from an optical axis of the optical element.

Next, the process calculates an amount $D_j$ to be changed of the optical system parameter (j denotes an integer from 1 to N). Then, the process calculates a change amount $\Delta W_j$ of the wavefront on the sensor surface 8a when a j-th optical system parameter of the selected N (one or more) optical system parameters is changed by a unit amount. The change amount $\Delta W_j$ is expressed by the following expression (3):

$$\Delta W_j = \sum_{i=1}^{n} a_{ij} Z_{(i+1)^2} \quad (3)$$

where $a_{ij}$ represents a change amount of a wavefront component of the spherical term $Z_{(i+1)^2}$ on the sensor surface 8a when the j-th optical system parameter is changed by the unit amount.

When j is changed from 1 to N, a difference $\Delta W'$ of the spherical components of the measured wavefront $W_m$ and the calculated wavefront $W_{cal}$ obtained by using the sensor 8 after the change of the j-th optical system parameter by the amount $D_j$ is expressed by the following expression (4):

$$\Delta W' = \Delta W - \sum_{j=1}^{N} D_j \Delta W_j = \sum_{i=1}^{n} \left( s_i - \sum_{j=1}^{N} a_{ij} D_j \right) Z_{(i+1)^2} \quad (4)$$

Since the Zernike function is an orthogonal function, in order to bring the difference $\Delta W'$ to 0, that is, to obtain coincidence of the measured wavefront $W_m$ with the calculated wavefront $W_{cal}$ it is only necessary to calculate $D_j$ by which each of terms of the Zernike function becomes 0 when n is equal to or less than N. Thus, it is necessary to satisfy a condition shown by the following expression (5) where i changes from 1 to n:

$$s_i - \sum_{j=1}^{N} a_{ij} D_j = 0 \quad (5)$$

Moreover, in order to minimize the difference $\Delta W'$ when n is greater than N, it is only necessary that a square sum Q of coefficients of the respective terms of the Zernike function of the difference $\Delta W'$ shown by the following expression (6):

$$Q = \sum_{i=1}^{n} \left( s_i - \sum_{j=1}^{N} a_{ij} D_j \right)^2 \quad (6)$$

A condition to minimize the square sum Q is that a value obtained by differentiating the square sum Q with $D_j$ becomes 0. Therefore, it is only necessary to calculate $D_j$ that satisfies the following expression (7) when j changes from 1 to N.

$$\frac{dQ}{dD_j} = 0 \quad (7)$$

Thus, the amount D to be changed of the optical system parameter is calculated. Since the change amount of the wavefront becomes smaller as an order of the Zernike function becomes higher (that is, as n of Zn increases), a highest order of the spherical term using in the calculation may be appropriately limited. Depending on optical system configuration, it is often sufficient that the measured wavefront coincides with the calculated wavefront at the spherical terms $Z_4$, $Z_9$ and $Z_{16}$.

It is desirable that the number N of the optical system parameters to be changed be 2 or more since the difference between the measured wavefront and the calculated wavefront cannot become sufficiently small when N is 1. On the other hand, it is desirable that N be equal to or less than n since N greater than n causes cross talk in the change of the wavefront by the change of the optical system parameters, which causes a significant deviation from the designed value despite the coincidence of the measured wavefront $W_m$ and the calculated wavefront $W_{cal}$ obtained as a result of satisfaction of the condition shown by the expression (5)

Moreover, it is desirable that the change amount of each optical system parameter be small since it is desirable that the optical system after the change of the optical system parameter be close to a designed optical system as much as possible. Therefore, it is preferable to select an optical system parameter that provides a greater difference (change amount) between the spherical components of the measured wavefronts $W_m$ before and after the change of the optical system parameter than that provided when one or more other optical system parameters is changed. Moreover, as the optical system parameter to be changed, one may be selected which changes a frequency component of the difference (change amount) between the spherical components of the measured wavefronts $W_m$ before and after the change of the optical system parameter, in other words, one may be selected which provides a near-linearly independent difference between the coefficients of each of the spherical terms $Z_4$, $Z_9$, $Z_{16}$, ... of the Zernike function before and after the change of the optical system parameter.

In addition, designing part of the optical system such that it satisfies the above-mentioned conditions shown by the expressions (5) and (7) in advance and changing a target optical system parameter also can decrease the change amount of the optical system parameter. Furthermore, as one of the optical system parameter to be changed, distance (surface distance) between the projecting lens 5 and the reference lens 10 may be selected to move the reference lens 10 by the change amount calculated by using the expression (5) or (7) through the moving mechanism 6. This method makes the optical system used in calculation closer to a real optical system, which enables measurement of the surface profile with higher accuracy.

At step B-6, the process calculates, in the optical system whose one or more optical system parameters have been changed in calculation, the positional magnification distribution $\alpha$ and the angular magnification distribution $\beta$ between the sensor surface 8a and the sensor conjugate surface by using the ray tracing software.

Figure 6:
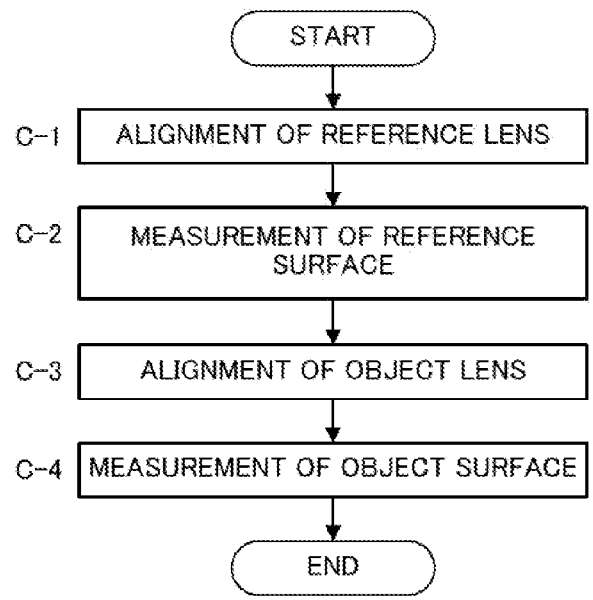
FIG. 6 is a flowchart showing a measurement step in Embodiment 1.

Next, description of the profile measurement step C will be made with reference to a flowchart shown in FIG. 6.

At step C-1, the process adjusts the position and tilt of the reference lens 10 through the moving mechanism 6 as well as at step B-4.

At step C-2, the process measures an angular distribution (first ray angle distribution) $V_1$ of the rays reflected by the reference surface 10a on the sensor surface by the sensor 8, and stores data of the ray angle distribution $V_1$ to the analysis calculating device 9. Then, the process calculates the measured wavefront $W_m$ by an integration process described later. If the measured wavefront $W_m$ and the calculation wavefront $W_{cal}$ have a large difference, the process determines that the error involved in the optical system increases and performs the magnification distribution calculation step B again.

At step C-3, the process allows removal of the reference lens 10 from the moving mechanism 6 and placement of the measurement object lens 11 to the moving mechanism 6. Then, the process adjusts the position and tilt of the measurement object lens 11 through the moving mechanism 6 so as to reduce a difference between the wavefront of the light reflected by the measurement object surface 11a and the wavefront of the light reflected by the reference surface 10a since it is necessary that the measurement object surface 11a coincides with the reference surface 10a as much as possible. At this step, position adjustment in the optical axis direction may be made by measuring center positions of the reference surface 10a and the measurement object surface 11a by using another (external) measuring apparatus such as a length measuring device or a displacement meter and by placing the measurement object surface 11a such that its center position coincides with the center position of the reference surface 10a.

At step C-4, the process measures an angular distribution (second ray angle distribution) $V_2$ of the rays reflected by the measurement object surface 11a on the sensor surface, and stores data of the ray angle distribution $V_2$ to the analysis calculating device 9.

In a case where error (so-called "change with time") of the optical system caused by drift or disturbance such as temperature change is small in the measuring apparatus 100, it is not necessary to perform steps C-1 and C-2 each time. For example, the process may perform steps C-1 and C-2 once, and thereafter consecutively measure two or more measurement object lenses 11 whose designed values are mutually same.

Next, description will be made of the analysis step (profile calculation step) D with reference to a flowchart shown in FIG. 7.

At step D-1, the process divides the ray angle distributions $V_2$ and $V_2$ measured respectively for the reference surface 10a and the measurement object surface 11a by the angular magnification distribution β, as shown by the following expression (8), and adds a principal ray angle distribution η to a result of the division to calculate ray angle distributions $v_2$ and $v_2$ on the sensor conjugate surface. The principal ray angle distribution η is an incident angle distribution of rays reaching the reference surface 10a when performing the ray tracing calculation using the designed value and parallel to the optical axis (that is, at a ray angle of 0° with respect to the optical axis) from the sensor surface 8a.

$$v_i = V_i/\beta + \eta \quad (i=1,2) \tag{8}$$

Next, the process calculates a ray position distribution (ray coordinate distribution) r on the sensor conjugate surface by multiplying a ray position distribution (ray coordinate distribution) Rc measured on the sensor surface 8a by the positional magnification distribution α, as shown by the following expression (9). The ray position distribution Rc on the sensor surface 8a corresponds, when the sensor 8 is constituted by the Shack-Hartmann sensor, to center positions of the respective microlenses of the image sensor. The ray position distribution Rc on the sensor surface 8a and the ray position distribution r on the sensor conjugate surface show distance from the optical axis, which are expressed by positions (coordinates) on the x-y plane as follows:

$$r=\sqrt{(x^2+y^2)}$$

$$r=\alpha \times R_c \tag{9}$$

At step D-2, the process performs the ray tracing calculation based on the ray position distribution r on the sensor conjugate surface and the ray angle distributions $v_1$ and $v_2$ on the sensor conjugate surface for the reference surface 10a and the measurement object surface 11a to calculate intersection points $r_{b1}$ and $r_{b2}$ with the reference surface 10a. The intersection points $r_{b1}$ and $r_{b2}$ show distance from the optical axis, which are expressed by positions (coordinates) on the x-y plane.

Next, at step D-3, the process calculates a ray angle distribution (ray angles) $v_2'$ on the measurement object surface 11a at the intersection point $r_{b1}$ by performing interpolation calculation or the like on the ray angle distribution (ray angles) $v_2$ on the measurement object surface 11a at the intersection point $r_{b2}$. Then, the process calculates a difference Δs of slopes of the ray angle distribution $v_1$ for the reference surface 10a and the ray angle distribution $v_2'$ for the measurement object surface 11a, as shown by the following expression (10):

$$\Delta s = \tan(v_2') - \tan(v_1) \tag{10}$$

At step D-4, the process integrates the slope difference Δs. Since the slope difference Δs is a value obtained by differentiating the surface profile difference between the reference surface 10a and the measurement object surface 11a, integration of the slope difference Δs enables calculation of the surface profile difference between the reference surface 10a and the measurement object surface 11a. As algorithm of the integration, a method (modal method) can be employed which performs fitting on the slope difference Δs by using a differential function of a basis function having samplings of the ray position $r_{b1}$, and multiplies the basis function by coefficients obtained by the fitting. And, a method (zonal method) can also be employed which adds the slope differences. These methods are described in W. H. Southwell, "Wave-front estimation from wave-front slope measurement" (J. Opt. Soc. Amr. 70, pp 998-1006, 1980).

At step D-5, the process adds data of the reference surface 10a measured at step A-1 to the surface profile difference calculated at step D-4 to calculate the profile of the measurement object surface 11a.

Figure 2:
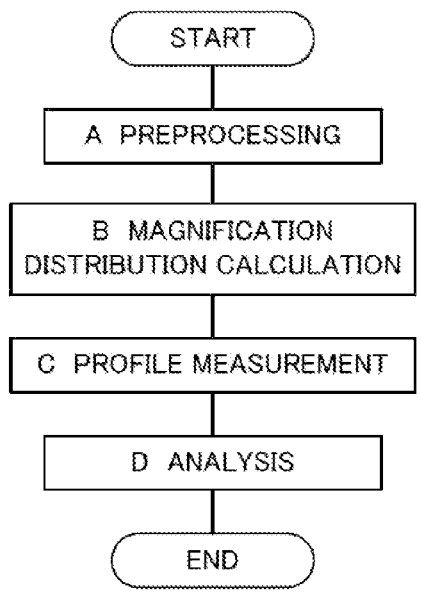
FIG. 2 is a flowchart showing the aspheric surface measuring method of Embodiment 1 (and of Embodiment 2).

Performing the measurement process of FIG. 2 described above enables non-contact fast measurement of the profile of the measurement object surface 11a with high accuracy even if the optical system involves any error.

Although this embodiment uses, as the measurement object surface, a surface of the measurement object lens, the measurement object surface may be surfaces of other objects such as a surface of a mirror or of a metal mold.

Embodiment 2

Next, description will be made of an aspheric surface measuring apparatus configured to perform measurement by an aspheric surface measuring method that is a second embodiment (Embodiment 2) of the present invention. The aspheric surface measuring apparatus of this embodiment has a same configuration as that of the measuring apparatus 100 of Embodiment 1 shown in FIG. 1. However, in the measuring apparatus of this embodiment, the process calculates the profile of the measurement object surface 11a by ray tracing calculation without using the data table of the positional magnification distribution α and the angular magnification distribution β.

Figure 4:
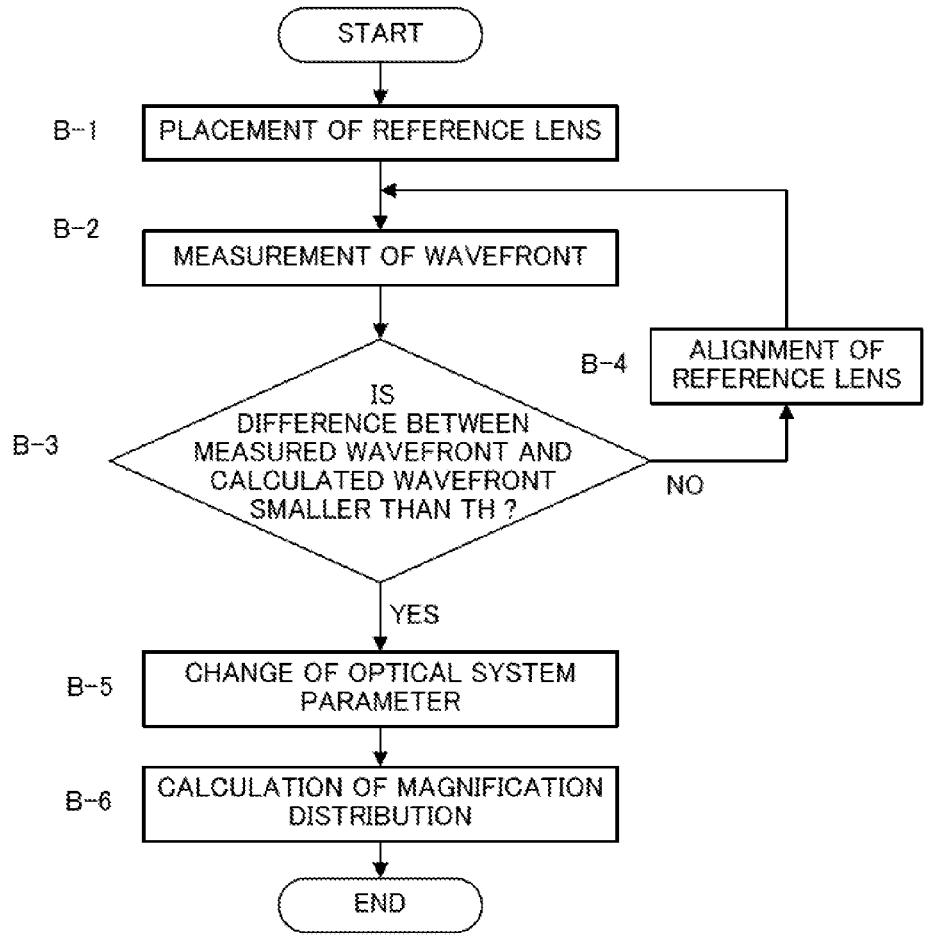
FIG. 4 is a flowchart showing a magnification distribution calculation step.

In this embodiment, as compared with Embodiment 1, step B-6 shown in FIG. 4 is omitted, and in place of steps D-1 and D-2 shown in FIG. 7, steps D'-1 and D'-2 as a ray tracing calculation step described below are provided.

At step D'-1, the process performs ray tracing calculation on the optical system whose one or more optical system parameters have been changed from the designed optical system at step B-5 by using the ray angle distributions (first and second ray angle distributions) $V_1$ and $V_2$ for the reference surface 10a and the measurement object surface 11a. The process thus calculates intersection points $r_{b1}$ and $r_{b2}$ of rays with the reference surface 10a.

At step D'-2, the process performs calculates, by ray tracing calculation, a ray angle distribution (ray angles) $v_1$ on the reference surface 10a at the intersection point $r_{b1}$ and a ray angle distribution (ray angles) $v_2$ on the reference surface 10a at the intersection point $r_{b2}$.

Figure 7:
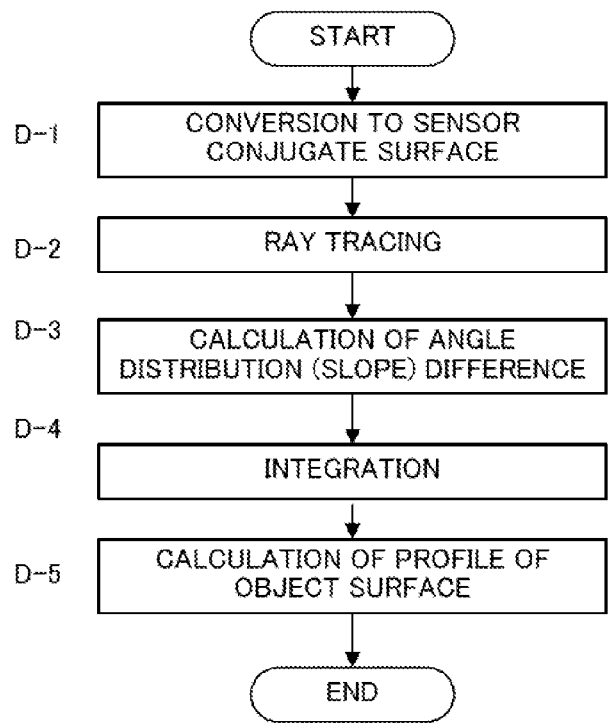
FIG. 7 is a flowchart showing an analysis step in Embodiment 1.

Then, the process performs steps D-3 to D-5 shown in FIG. 7 to calculate the profile of the measurement object surface 11a.

This embodiment requires, as compared with Embodiment 1, a ray tracing software built in the measuring apparatus and an interface between the ray tracing software and the analysis software. However, this embodiment does not use the magnification distributions (α and β) unlike Embodiment 1, thereby making it possible to produce the analysis software more easily.

Embodiment 3

Figure 8:
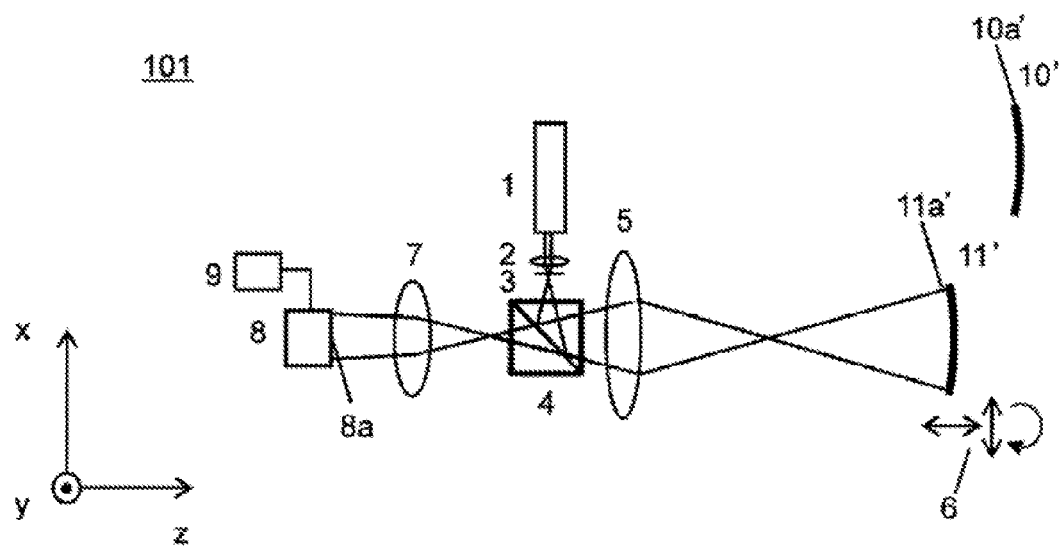
FIG. 8 schematically shows a configuration of an aspheric surface measuring apparatus using an aspheric surface measuring method that is Embodiment 3 of the present invention.

Next, description will be made of an aspheric surface measuring method and an aspheric surface measuring apparatus applicable to a case where the measurement object surface is formed to have a concave aspheric shape, with reference to FIG. 8. FIG. 8 shows a configuration of the aspheric surface measuring apparatus 101 performing measurement by the aspheric surface measuring method of this embodiment. Use of this measuring apparatus 101 enables the measurement of the measurement object surface 11a' that is an aspheric surface and a concave surface, as well as Embodiments 1 and 2.

Reference numeral 10' denotes a reference lens whose one side surface is a reference surface 10a'. Reference numeral 11' denotes a measurement object lens whose one side surface is the measurement object surface 11a'.

Other components of the measuring apparatus 101 are same as those of the measuring apparatus 100 of Embodiment 1 shown in FIG. 1. As well as in Embodiments 1 and 2, the measurement object lens 11' is placed at a position where a center of curvature of the measurement object surface 11a' in a paraxial region coincides with a center of curvature of divergent light from the projecting lens 5

Also in this embodiment, the process performs same processes as the preprocessing step A, the magnification distribution calculation step B, the profile measurement step C and the analysis step D in Embodiments 1 and 2, which enables non-contact fast measurement of the profile of the measurement object surface 11a' with high accuracy.

Embodiment 4

Figure 9:
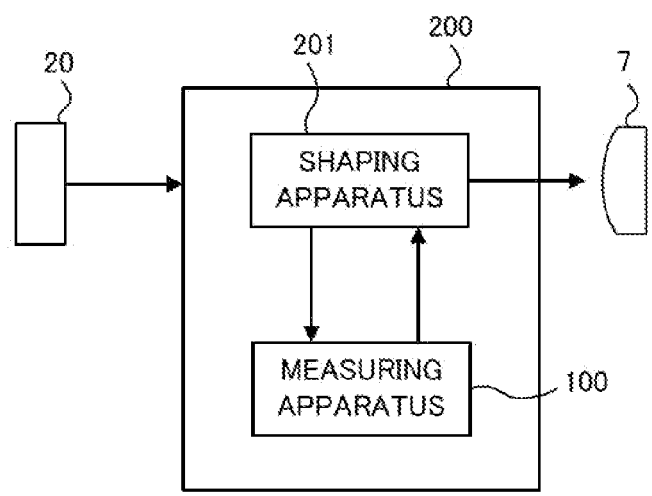
FIG. 9 schematically shows a configuration of an optical element producing apparatus that is Embodiment 4 of the present invention.

FIG. 9 shows a configuration of an optical element producing apparatus 200 including the aspheric surface measuring apparatus 100 described in Embodiment 1. The optical element producing apparatus 200 may use the measuring apparatus described in Embodiment 2 or 3, instead of the measuring apparatus 100 described in Embodiment 1.

In FIG. 9, reference numeral 20 denotes a material of the measurement object lens 11, and reference numeral 201 denotes a shaping apparatus that performs shaping processes such as cutting and polishing to shape the measurement object lens 11 as an optical element.

A surface profile of the measurement object surface 11a of the measurement object lens 11 shaped by the shaping apparatus 201 is measured by using the aspheric surface measuring method described in Embodiment 1 in the aspheric surface measuring apparatus 100. The measuring apparatus 100 calculates, in order to shape the measurement object surface 11a into a target surface profile, a correction shaping amount for the measurement object surface 11a based on a difference between data of the measured profile of the measurement object surface 11a and the data of the target surface profile, and outputs it to the shaping apparatus 201. Thus, the shaping apparatus 201 performs a correction shaping process using the correction shaping amount to complete the measurement object lens 11 having the measurement object surface 11a whose surface profile coincides with the target surface profile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-052500, filed on Mar. 9, 2012, which is hereby incorporated by reference herein in its entirety.

What is claimed is:

1. An aspheric surface measuring method for measuring profile of a measurement object aspheric surface by using output from a light-receiving sensor to which a measurement light projected onto and reflected by the measurement object aspheric surface is introduced through an optical system, the method comprising:

a step of providing a reference aspheric surface whose profile has been measured;

a step of measuring a first wavefront of a reference light, which is projected onto and reflected by the reference aspheric surface and is introduced to the light-receiving sensor through the optical system, on the light-receiving sensor by using the output from the light-receiving sensor;

a step of calculating a second wavefront of the reference light on the light-receiving sensor by using a parameter of the optical system;

a parameter change step of changing the parameter of the optical system in calculation such that a difference between rotationally symmetric components of the first and second wavefronts becomes smaller than before the change of the parameter;

a step of calculating, by using the changed parameter, at least one magnification distribution of (a) a positional magnification distribution showing a positional relationship of rays of the reference light between positions on the light-receiving sensor and on a sensor conjugate surface having a conjugate relationship with the light-receiving sensor provided by the optical system and (b) an angular magnification distribution showing an angular relationship of the rays of the reference light between angles on the light-receiving sensor and on the sensor conjugate surface;
a step of measuring a first ray angle distribution that is an angle distribution of the rays of the reference light by using the output from the light-receiving sensor;
a step of measuring a second ray angle distribution that is an angle distribution of rays of the measurement light by using the output from the light-receiving sensor; and
a step of calculating the profile of the measurement object aspheric surface by using the profile of the reference aspheric surface, the first ray angle distribution, the second ray angle distribution and the at least one magnification distribution.

2. An aspheric surface measuring method according to claim 1, wherein the parameter is at least one of distance between optical surfaces of one or more optical elements included in the optical system, curvature radius of each optical surface, profile of each optical surface, aberration generated by each optical element, refractive index of a material of each optical element and homogeneity of each optical element.

3. An aspheric surface measuring method according to claim 1, wherein the parameter change step changes two or more parameters.

4. An aspheric surface measuring method according to claim 1, wherein the parameter change step selects, as the parameter to be changed, one whose change changes a frequency component of a difference between the rotationally symmetric components of the first wavefront before and after the change thereof.

5. An aspheric surface measuring method according to claim 1, wherein the parameter change step selects, as the parameter to be changed, one whose change provides a larger difference between the rotationally symmetric components of the first wavefront before and after the change thereof than that provided by change of other ones.

6. An aspheric surface measuring method according to claim 1, wherein the method interchanges an optical element included in the optical system, among optical elements whose focal lengths are mutually different, depending on curvature radius of the measurement object aspheric surface.

7. An aspheric surface measuring method for measuring profile of a measurement object aspheric surface by using output from a light-receiving sensor to which a measurement light projected onto and reflected by the measurement object aspheric surface is introduced through an optical system, the method comprising:
a step of providing a reference aspheric surface whose profile has been measured;
a step of measuring a first wavefront of a reference light, which is projected onto and reflected by the reference aspheric surface and is introduced to the light-receiving sensor through the optical system, on the light-receiving sensor by using the output from the light-receiving sensor;
a step of calculating a second wavefront of the reference light on the light-receiving sensor by using a parameter of the optical system;
a parameter change step of changing a parameter of the optical system in calculation such that a difference between rotationally symmetric components of the first and second wavefronts becomes smaller than before the change of the parameter;
a step of measuring a first ray angle distribution that is an angle distribution of rays of the reference light by using the output from the light-receiving sensor;
a step of measuring a second ray angle distribution that is an angle distribution of rays of the measurement light by using the output from the light-receiving sensor;
a step of performing ray tracing calculation of the rays of the reference light by using the changed parameter, the first ray angle distribution and the second ray angle distribution to calculate intersection points of the rays of the reference light with the reference aspheric surface and ray angles thereof at the intersection points; and
a step of calculating the profile of the measurement object aspheric surface by using the profile of the reference aspheric surface, the intersection points and the ray angles thereat.

8. An aspheric surface measuring method according to claim 7, wherein the parameter is at least one of distance between optical surfaces of one or more optical elements included in the optical system, curvature radius of each optical surface, profile of each optical surface, aberration generated by each optical element, refractive index of a material of each optical element and homogeneity of each optical element.

9. An aspheric surface measuring method according to claim 7, wherein the parameter change step changes two or more parameters.

10. An aspheric surface measuring method according to claim 7, wherein the parameter change step selects, as the parameter to be changed, one whose change changes a frequency component of a difference between the rotationally symmetric components of the first wavefront before and after the change thereof.

11. An aspheric surface measuring method according to claim 7, wherein the parameter change step selects, as the parameter to be changed, one whose change provides a larger difference between the rotationally symmetric components of the first wavefront before and after the change thereof than that provided by change of other ones.

12. An aspheric surface measuring method according to claim 7, wherein the method interchanges an optical element included in the optical system, among optical elements whose focal lengths are mutually different, depending on curvature radius of the measurement object aspheric surface.

13. An aspheric surface measuring apparatus configured to measure profile of a measurement object aspheric surface, the apparatus comprising:
an optical system;
a light-receiving sensor to which a measurement light projected onto and reflected by the measurement object aspheric surface is introduced through the optical system;
a wavefront measuring device configured to measure a first wavefront of a reference light, which is projected onto and reflected by a reference aspheric surface whose profile has been measured and is introduced to the light-receiving sensor through the optical system, on the light-receiving sensor by using the output from the light-receiving sensor;
a wavefront calculating device configured to calculate a second wavefront of the reference light on the light-receiving sensor by using a parameter of the optical system;
a parameter changing device configured to change the parameter of the optical system in calculation such that a difference between rotationally symmetric components of the first and second wavefronts becomes smaller than before the change of the parameter; and a profile calculating device configured to calculate the profile of the measurement object aspheric surface, wherein the profile calculating device is configured to:
calculate, by using the parameter changed by the parameter changing device, at least one magnification distribution of (a) a positional magnification distribution showing a positional relationship of rays of the reference light between positions on the light-receiving sensor and on a sensor conjugate surface having a conjugate relationship with the light-receiving sensor provided by the optical system and (b) an angular magnification distribution showing an angular relationship of the rays of the reference light between angles on the light-receiving sensor and on the sensor conjugate surface;

measure, by using the output from the light-receiving sensor, (a) a first ray angle distribution that is an angle distribution of the rays of the reference light and (b) a second ray angle distribution that is an angle distribution of rays of the measurement light; and calculate the profile of the measurement object aspheric surface by using the profile of the reference aspheric surface, the first ray angle distribution, the second ray angle distribution and the at least one magnification distribution.

14. An aspheric surface measuring apparatus configured to measure profile of a measurement object aspheric surface, the apparatus comprising:

an optical system;

a light-receiving sensor to which a measurement light projected onto and reflected by the measurement object aspheric surface is introduced through the optical system;

a wavefront measuring device configured to measure a first wavefront of a reference light, which is projected onto and reflected by a reference aspheric surface whose profile has been measured and is introduced to the light-receiving sensor through the optical system, on the light-receiving sensor by using the output from the light-receiving sensor;

a wavefront calculating device configured to calculate a second wavefront of the reference light on the light-receiving sensor by using a parameter of the optical system;

a parameter changing device configured to change the parameter of the optical system in calculation such that a difference between rotationally symmetric components of the first and second wavefronts becomes smaller than before the change of the parameter; and a profile calculating device configured to calculate the profile of the measurement object aspheric surface, wherein the profile calculating device is configured to:
measure, by using the output from the light-receiving sensor, (a) a first ray angle distribution that is an angle distribution of rays of the reference light reflected by the reference aspheric surface and (b) a second ray angle distribution that is an angle distribution of rays of the measurement light;

perform ray tracing calculation of the rays of the reference light by using the changed parameter, the first ray angle distribution and the second ray angle distribution to calculate intersection points of the rays of the reference light with the reference aspheric surface and ray angles thereof at the intersection points; and calculate the profile of the measurement object aspheric surface by using the profile of the reference aspheric surface, the intersection points and the ray angles thereat.

15. An optical element producing apparatus comprising:

a shaping apparatus configured to shape an optical element; and a measuring apparatus configured to measure profile of a measurement object aspheric surface of the optical element by an aspheric surface measuring method using output from a light-receiving sensor to which a measurement light projected onto and reflected by the measurement object aspheric surface is introduced through an optical system, the method comprising:

a step of providing a reference aspheric surface whose profile has been measured;

a step of measuring a first wavefront of a reference light, which is projected onto and reflected by the reference aspheric surface and is introduced to the light-receiving sensor through the optical system, on the light-receiving sensor by using the output from the light-receiving sensor;

a step of calculating a second wavefront of the reference light on the light-receiving sensor by using a parameter of the optical system;

a parameter change step of changing the parameter of the optical system in calculation such that a difference between rotationally symmetric components of the first and second wavefronts becomes smaller than before the change of the parameter;

a step of calculating, by using the changed parameter, at least one magnification distribution of (a) a positional magnification distribution showing a positional relationship of rays of the reference light between positions on the light-receiving sensor and on a sensor conjugate surface having a conjugate relationship with the light-receiving sensor provided by the optical system and (b) an angular magnification distribution showing an angular relationship of the rays of the reference light between angles on the light-receiving sensor and on the sensor conjugate surface;

a step of measuring a first ray angle distribution that is an angle distribution of the rays of the reference light by using the output from the light-receiving sensor;

a step of measuring a second ray angle distribution that is an angle distribution of rays of the measurement light by using the output from the light-receiving sensor; and a step of calculating the profile of the measurement object aspheric surface by using the profile of the reference aspheric surface, the first ray angle distribution, the second ray angle distribution and the at least one magnification distribution.

16. An optical element producing apparatus comprising:

a shaping apparatus configured to shape an optical element; and a measuring apparatus configured to measure profile of a measurement object aspheric surface of the optical element by an aspheric surface measuring method using output from a light-receiving sensor to which a measurement light projected onto and reflected by the measurement object aspheric surface is introduced through an optical system, the method comprising:

a step of providing a reference aspheric surface whose profile has been measured;

a step of measuring a first wavefront of a reference light, which is projected onto and reflected by the reference aspheric surface and is introduced to the light-receiving sensor through the optical system, on the light-receiving sensor by using the output from the light-receiving sensor;

a step of calculating a second wavefront of the reference light on the light-receiving sensor by using a parameter of the optical system;

a parameter change step of changing a parameter of the optical system in calculation such that a difference between rotationally symmetric components of the first and second wavefronts becomes smaller than before the change of the parameter;

a step of measuring a first ray angle distribution that is an angle distribution of rays of the reference light by using the output from the light-receiving sensor;

a step of measuring a second ray angle distribution that is an angle distribution of rays of the measurement light by using the output from the light-receiving sensor;

a step of performing ray tracing calculation of the rays of the reference light by using the changed parameter, the first ray angle distribution and the second ray angle distribution to calculate intersection points of the rays of the reference light with the reference aspheric surface and ray angles thereof at the intersection points; and a step of calculating the profile of the measurement object aspheric surface by using the profile of the reference aspheric surface, the intersection points and the ray angles thereat.

17. An optical element comprising:
a body of the optical element; and
an aspheric surface formed on the body,
wherein the optical element is produced by using an optical element producing apparatus including a shaping apparatus configured to shape an optical element, and a measuring apparatus configured to measure a profile of a measurement object aspheric surface of the optical element by an aspheric surface measuring method using output from a light-receiving sensor to which a measurement light projected onto and reflected by the measurement object aspheric surface is introduced through an optical system, and
wherein
a step of providing a reference aspheric surface whose profile has been measured;

a step of measuring a first wavefront of a reference light, which is projected onto and reflected by the reference aspheric surface and is introduced to the light-receiving sensor through the optical system, on the light-receiving sensor by using the output from the light-receiving sensor;

a step of calculating a second wavefront of the reference light on the light-receiving sensor by using a parameter of the optical system;

a parameter change step of changing the parameter of the optical system in calculation such that a difference between rotationally symmetric components of the first and second wavefronts becomes smaller than before the change of the parameter;

a step of calculating, by using the changed parameter, at least one magnification distribution of (a) a positional magnification distribution showing a positional relationship of rays of the reference light between positions on the light-receiving sensor and on a sensor conjugate surface having a conjugate relationship with the light-receiving sensor provided by the optical system and (b) an angular magnification distribution showing an angular relationship of the rays of the reference light between angles on the light-receiving sensor and on the sensor conjugate surface;

a step of measuring a first ray angle distribution that is an angle distribution of the rays of the reference light by using the output from the light-receiving sensor;

a step of measuring a second ray angle distribution that is an angle distribution of rays of the measurement light by using the output from the light-receiving sensor; and a step of calculating the profile of the measurement object aspheric surface by using the profile of the reference aspheric surface, the first ray angle distribution, the second ray angle distribution and the at least one magnification distribution.

18. An optical element comprising:
a body of the optical element; and
an aspheric surface formed on the body,
wherein the optical element is produced by using an optical element producing apparatus including a shaping apparatus configured to shape an optical element, and a measuring apparatus configured to measure a profile of a measurement object aspheric surface of the optical element by an aspheric surface measuring method using output from a light-receiving sensor to which a measurement light projected onto and reflected by the measurement object aspheric surface is introduced through an optical system, the method comprising:

a step of providing a reference aspheric surface whose profile has been measured;

a step of measuring a first wavefront of a reference light, which is projected onto and reflected by the reference aspheric surface and is introduced to the light-receiving sensor through the optical system, on the light-receiving sensor by using the output from the light-receiving sensor;

a step of calculating a second wavefront of the reference light on the light-receiving sensor by using a parameter of the optical system;

a parameter change step of changing a parameter of the optical system in calculation such that a difference between rotationally symmetric components of the first and second wavefronts becomes smaller than before the change of the parameter;

a step of measuring a first ray angle distribution that is an angle distribution of rays of the reference light by using the output from the light-receiving sensor;

a step of measuring a second ray angle distribution that is an angle distribution of rays of the measurement light by using the output from the light-receiving sensor;

a step of performing ray tracing calculation of the rays of the reference light by using the changed parameter, the first ray angle distribution and the second ray angle distribution to calculate intersection points of the rays of the reference light with the reference aspheric surface and ray angles thereof at the intersection points; and a step of calculating the profile of the measurement object aspheric surface by using the profile of the reference aspheric surface, the intersection points and the ray angles thereat.

* * * * *